United States Patent
Penz

(10) Patent No.: US 9,982,783 B2
(45) Date of Patent: May 29, 2018

(54) AIRCRAFT GAS TURBINE WITH A SEAL FOR SEALING AN IGNITER PLUG ON THE COMBUSTION CHAMBER WALL OF A GAS TURBINE

(71) Applicant: Rolls-Royce Deutschland Ltd & Co KG, Blankenfelde-Mahlow (DE)

(72) Inventor: Stefan Penz, Werneuchen (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days. days.

(21) Appl. No.: 14/811,131

(22) Filed: Jul. 28, 2015

(65) Prior Publication Data

US 2016/0025221 A1 Jan. 28, 2016

(30) Foreign Application Priority Data

Jul. 28, 2014 (DE) .................. 10 2014 214 775

(51) Int. Cl.
| | |
|---|---|
| *F02C 7/266* | (2006.01) |
| *F16J 15/02* | (2006.01) |
| *F23Q 3/00* | (2006.01) |
| *F23R 3/00* | (2006.01) |
| *F23R 3/60* | (2006.01) |
| *F01D 11/00* | (2006.01) |

(52) U.S. Cl.
CPC .......... *F16J 15/022* (2013.01); *F01D 11/003* (2013.01); *F02C 7/266* (2013.01); *F23Q 3/008* (2013.01); *F23R 3/002* (2013.01); *F23R 3/60* (2013.01); *F05D 2240/55* (2013.01); *F23R 2900/00012* (2013.01)

(58) Field of Classification Search
CPC . F16J 15/104; F02C 7/266; F02C 7/28; F23R 2900/00012; F23R 3/60; F23Q 3/008
See application file for complete search history.

(56) References Cited

U.S. PATENT DOCUMENTS

| | | | |
|---|---|---|---|
| 3,922,851 A | 12/1975 | Irwin | |
| 4,216,651 A * | 8/1980 | Ormerod | F02C 7/266 |
| | | | 431/264 |

(Continued)

FOREIGN PATENT DOCUMENTS

| | | |
|---|---|---|
| EP | 1489360 A1 | 12/2004 |
| EP | 1962018 | 8/2008 |
| GB | 2445576 | 7/2008 |

OTHER PUBLICATIONS

European Search Report dated Dec. 22, 2015 for counterpart European application No. 15176991.6.

(Continued)

*Primary Examiner* — Eugene G Byrd
(74) *Attorney, Agent, or Firm* — Shuttleworth & Ingersoll, PLC; Timothy Klima

(57) ABSTRACT

A sealing arrangement of an igniter plug of a combustion chamber of a gas turbine, with an igniter plug passing through a recess of a combustion chamber wall, with at least one sealing ring through which the igniter plug projects and which is in sealing contact with an edge area of the recess facing away from the combustion chamber interior, wherein the sealing ring is designed in the form of a flat, annular and flexible disk.

11 Claims, 6 Drawing Sheets

(56) References Cited

U.S. PATENT DOCUMENTS

Figure 1:
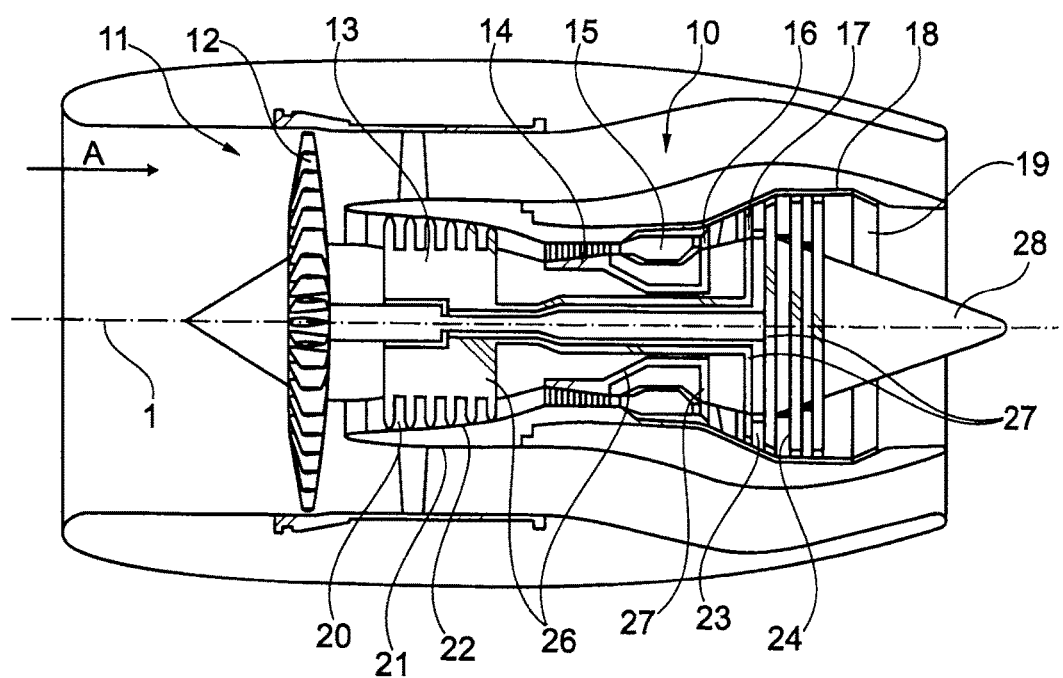

| | | | | |
|---|---|---|---|---|
| 5,085,250 | A * | 2/1992 | Kendrick | G01F 15/00 |
| | | | | 138/40 |
| 5,356,158 | A * | 10/1994 | Simmons | F16J 15/3436 |
| | | | | 277/370 |
| 6,351,949 | B1 * | 3/2002 | Rice | F23R 3/007 |
| | | | | 403/316 |
| 6,402,462 | B1 * | 6/2002 | Dipl-Ing | F04D 29/128 |
| | | | | 277/408 |
| 7,017,334 | B2 * | 3/2006 | Mayer | F02K 1/822 |
| | | | | 239/127.3 |
| 7,101,173 | B2 | 9/2006 | Hernandez et al. | |
| 7,497,443 | B1 * | 3/2009 | Steinetz | F16J 15/0887 |
| | | | | 277/644 |
| 9,038,395 | B2 * | 5/2015 | Rudrapatna | F23R 3/06 |
| | | | | 60/754 |
| 2003/0163995 | A1 | 9/2003 | White | |
| 2004/0104538 | A1 * | 6/2004 | Pidcock | F23R 3/002 |
| | | | | 277/549 |
| 2005/0072163 | A1 | 4/2005 | Wells et al. | |
| 2005/0132706 | A1 * | 6/2005 | Fukutani | F01D 3/02 |
| | | | | 60/726 |
| 2007/0257440 | A1 * | 11/2007 | Pecchioli | F01D 5/08 |
| | | | | 277/313 |
| 2008/0164658 | A1 * | 7/2008 | Do | F01D 11/005 |
| | | | | 277/355 |
| 2009/0235635 | A1 | 9/2009 | Ryan | |
| 2011/0120132 | A1 | 5/2011 | Rudrapatna et al. | |
| 2012/0255275 | A1 * | 10/2012 | Bunel | F02C 7/266 |
| | | | | 60/39.827 |
| 2013/0055716 | A1 * | 3/2013 | Gerendas | F23R 3/002 |
| | | | | 60/722 |
| 2016/0033043 | A1 * | 2/2016 | Busby | F16J 15/104 |
| | | | | 244/131 |

OTHER PUBLICATIONS

German Search Report dated Apr. 8, 2015 from counterpart German App No. 10 2014 214 775.1.

* cited by examiner

AIRCRAFT GAS TURBINE WITH A SEAL FOR SEALING AN IGNITER PLUG ON THE COMBUSTION CHAMBER WALL OF A GAS TURBINE

This application claims priority to German Patent Application DE102014214775.1 filed Jul. 28, 2014, the entirety of which is incorporated by reference herein.

This invention relates to a sealing arrangement in accordance with the present description.

In detail, the invention relates to a sealing arrangement of an igniter plug or of a measuring probe or a similar component which is passed through a combustion chamber wall of a gas turbine. In the following, the term igniter plug is used at all times, but this should not be understood as a restriction to this alone.

The sealing arrangement in accordance with the invention includes at least one sealing ring through which the igniter plug or measuring probe projects and which is in sealing contact with an edge area of the recess facing away from the combustion chamber interior. An embodiment of this type is already known from US 2005/0072163 A1, for example. It is known from the state of the art that an igniter plug is fastened to the combustion chamber casing and projects through the combustion chamber wall (which is designed with single or double wall) of the combustion chamber. Because of tolerances and relative movements due to pressure and heat flows, a gap must be maintained between the edge area of a recess in the combustion chamber wall and the igniter plug in order to prevent direct contact and hence damage to the components. Air passes uncontrolled through this gap into the combustion chamber and affects both combustion and cooling of the combustion chamber wall.

Various solutions for sealing the annular gap are already known from the state of the art. Reference is made here to US 2011/0120132 A1, GB 2 445 576 A, US 2003/0163995 A1 and US 2013/0055716 A1. It is thus known to provide tube-like designs requiring a large installation space and having complicated structures. This causes both high production costs for the sealing arrangement itself and a high assembly expenditure. Overall, tube-like and tower-like designs are already known in many cases and are either fastened to the igniter plug itself or are clamped to the inner combustion chamber wall (tile and tile carrier). These designs do not always lead to good sealing, particularly in the case of complex geometries of the combustion chamber wall, and they cannot be readily used at certain points on the combustion chamber wall.

If sealing of the inlet opening for the igniter plug is dispensed with, air is passed around the igniter plug into the combustion chamber. Due to the altered geometry in comparison with the other mixing air holes in the combustion chamber, the airflow varies as a result. This affects both the combustion and the cooling of the combustion chamber inner wall in this area. The altered temperature distributions result in local overheating or an increased cooling air requirement.

When the aforementioned tube-like embodiments are used, the result is the drawback, additionally to the increased production expenditure and the higher costs, that the airflow around the combustion chamber wall is locally affected. This also affects the airflow through the mixing air openings and cooling air holes located near the igniter plug. As a result, combustion and cooling varies in the area of both the igniter plug inlet and the adjacent mixing air holes. This leads, as already mentioned, to local overheating and an increased cooling air requirement.

With respect to the increased production expenditure, it must be taken into account that in cramped space conditions the tube-like seals must be fastened from the inside of the combustion chamber, for example by welding. This requires manual reworking of the inside of the combustion chamber wall to ensure sufficient sealing.

If a movable sealing ring is used between the outer and the inner combustion chamber wall, and is clamped into the intermediate space, as is shown for example by US 2013/0055716 A1, cooling of the combustion chamber wall and in particular of the inside of the combustion chamber is affected. Here too, local overheating and an increased cooling air requirement can result. The cooling air holes in this area cannot be provided in the optimum position and arrangement, in particular in the direction of the main flow.

The object underlying the present invention is to provide a sealing arrangement of the type specified at the beginning, which while being simply designed and easily and cost-effectively producible avoids the disadvantages of the state of the art and enables an optimized sealing.

It is a particular object to provide solution to the above problems by the combination of features described herein. Further advantageous embodiments will become apparent from the present description.

In accordance with the invention, it is thus provided that the sealing ring is designed in the form of a flat, annular and flexible disk. The latter is designed preferably as a sheet-metal component.

A crucial advantage of the embodiment in accordance with the invention is that it results in considerably reduced production expenditure. Furthermore, the routing of both the cooling air and the mixing air is affected only to a minimum extent since the sealing arrangement in accordance with the invention requires a very small installation space.

The sealing ring provided in accordance with the invention can, since it is a flat and lightweight component, be pressed against the combustion chamber wall by the pressure difference between the outside and the inside of the combustion chamber wall and held in sealing contact. It is not necessary to take additional measures to press or fix the sealing ring against the combustion chamber wall. During operation of the gas turbine, therefore, the sealing ring is in contact with the outside of the combustion chamber wall and thereby reduces the leakage airflow.

In a particularly favourable embodiment of the invention, the sealing ring is provided with slots, which are radial relative to its central recess, for passing through the igniter plug. These slots lead to a considerable increase in the flexibility of the sealing ring, such that the latter is in sealing contact even with non-flat areas of the combustion chamber wall.

In a particularly favourable development of the invention, it is provided that several sealing rings are placed one above the other. These several sealing rings can be preferably connected to one another, for example by spot welding. It can furthermore be favourable to arrange the slots of the several sealing rings offset to one another in the circumferential direction relative to the sealing ring. This results in particularly effective sealing.

Igniter plugs are often arranged in the lower area of the engine. The sealing ring would thus be in contact with the combustion chamber casing in particular when the aircraft gas turbine is at a standstill. To move the sealing ring mechanically into the vicinity of the combustion chamber wall and to ensure that during operation of the gas turbine the sealing ring is pressed by the pressure difference against the combustion chamber wall, it is particularly favourable when the igniter plug is provided with at least one contact element supporting the sealing ring. The contact element can be designed as a locking ring or adapter. In both cases, the contact element can be provided directly on the igniter plug. It is also possible to incorporate the contact element directly during manufacture of the adapter or igniter plug, or to provide contact elements or spacers on the igniter plug, for example by welding.

In a particularly favourable development of the invention, it is provided that the sealing ring is secured by a tubular adapter of extended design. This adapter is positioned outside the sealing ring. The igniter plug can here be passed through the extended adapter. Hence no changes are needed to the igniter plug itself. The additional tubular adapter is here braced at its radially outer area relative to the engine center axis against the adapter by means of which the igniter plug itself is fastened to the combustion chamber casing. It is thus ensured in an operationally safe way that the sealing ring or the several sealing rings are exactly positioned.

The result in accordance with the invention is therefore a simple and cost-effective structure for the entire sealing arrangement. The latter exerts little effect on cooling in the vicinity of the mixing air openings and is characterized in particular by a low structural height.

Figure 2:
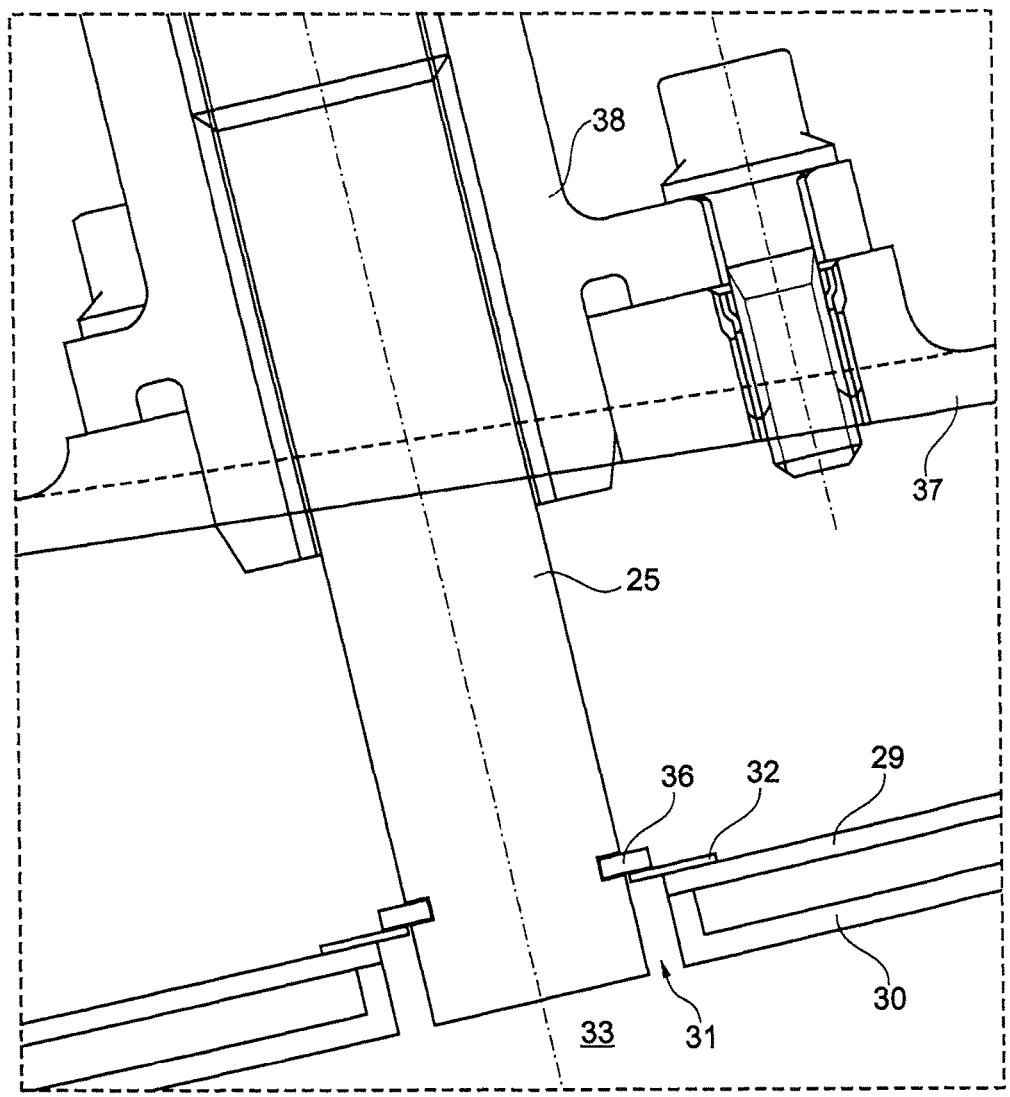
Figure 3:
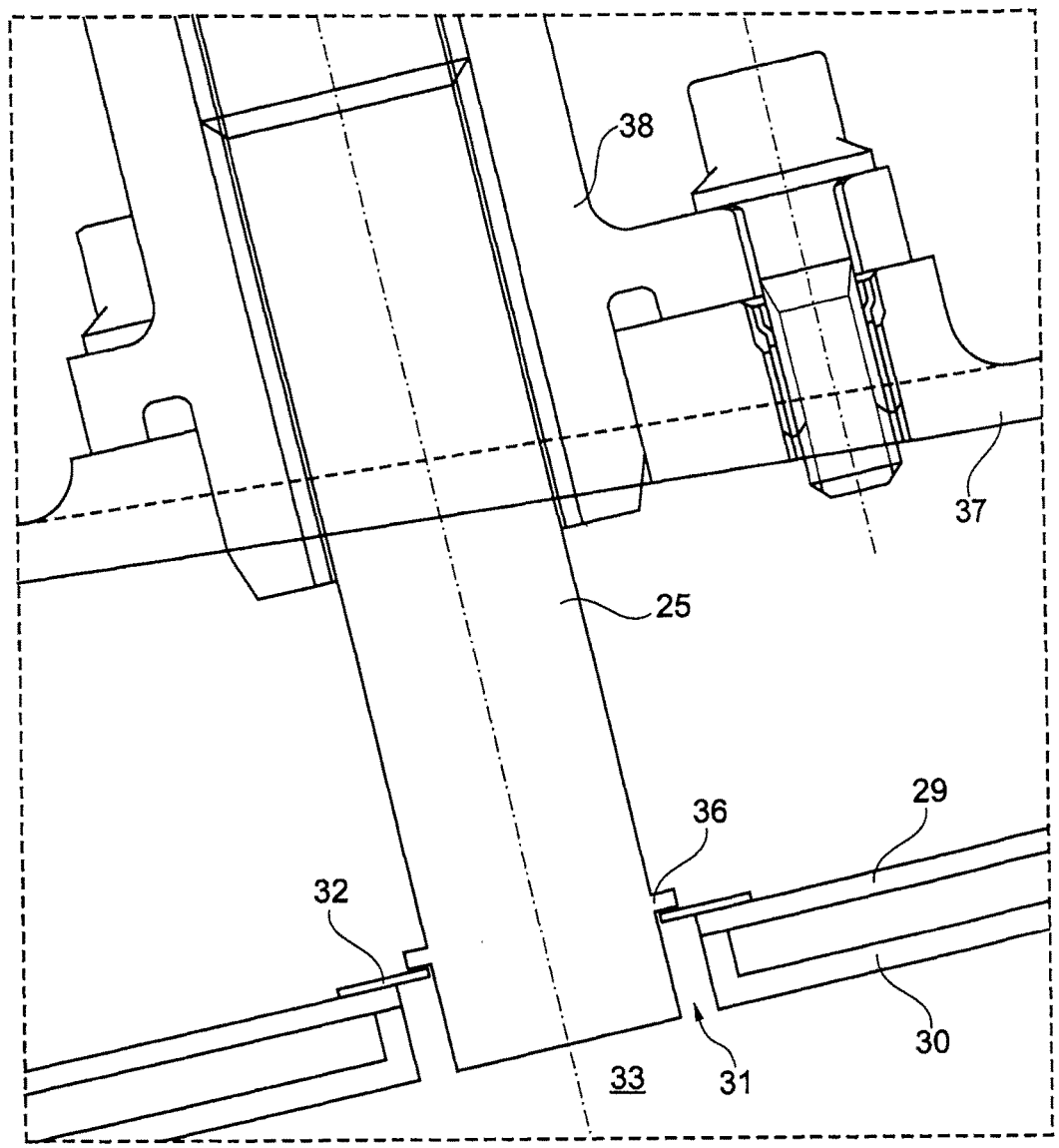
Figure 4:
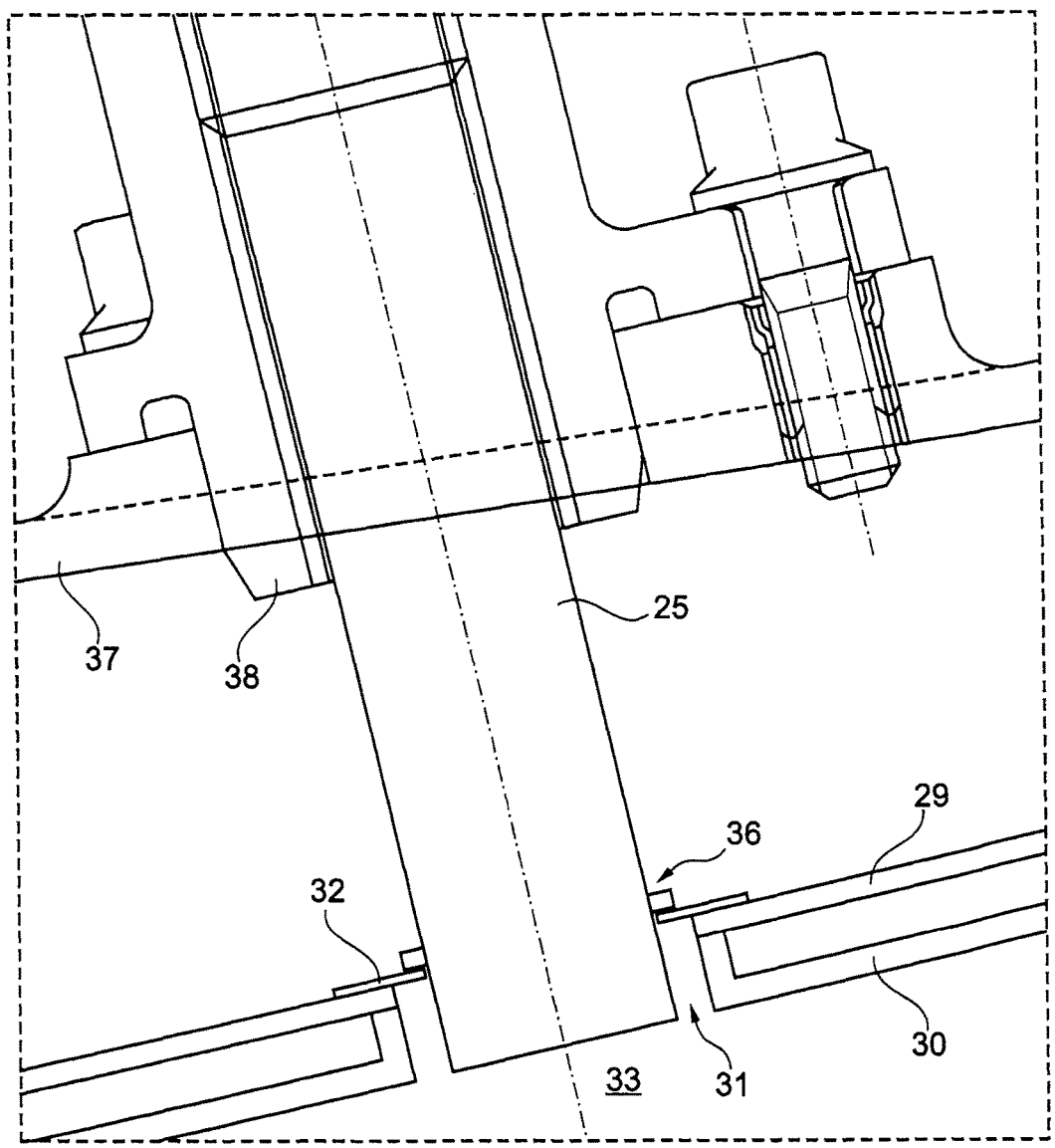
Figure 5:
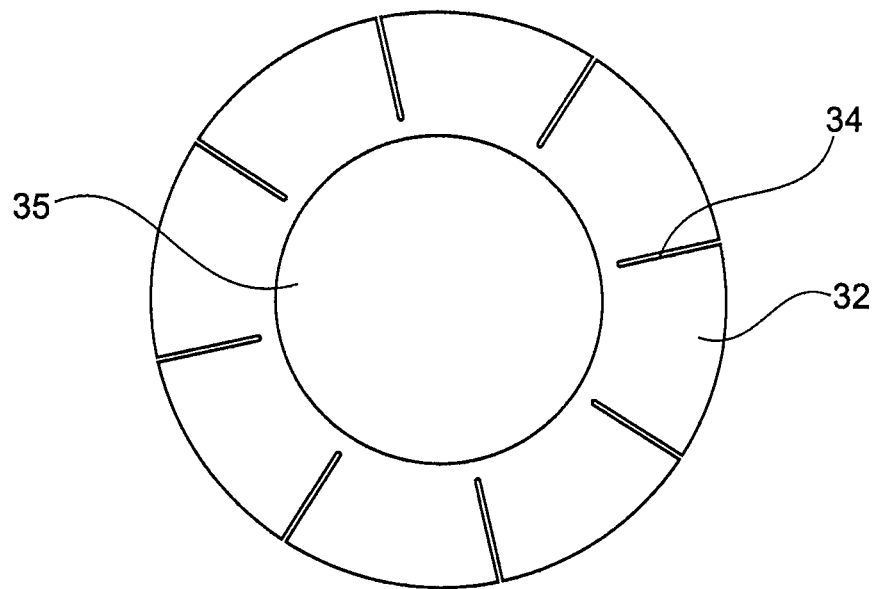
Figure 6:
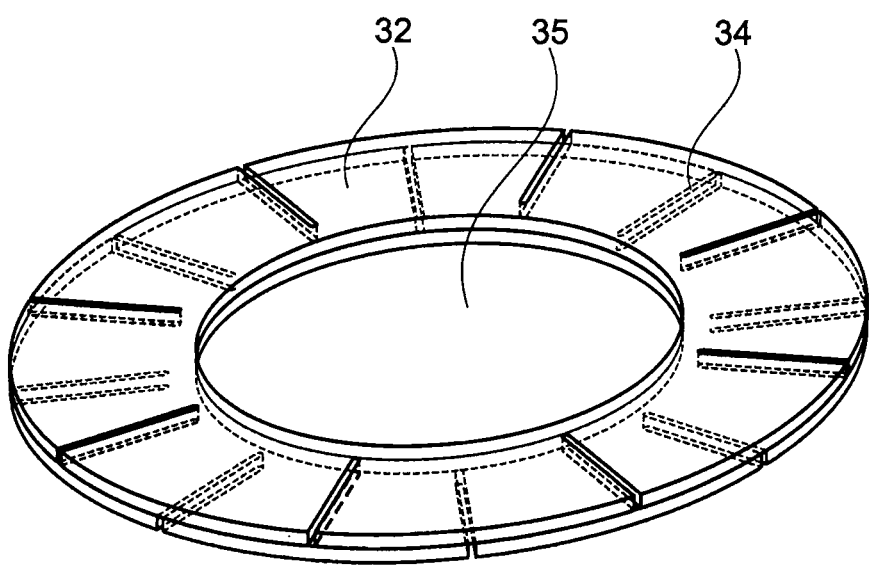
Figure 7:
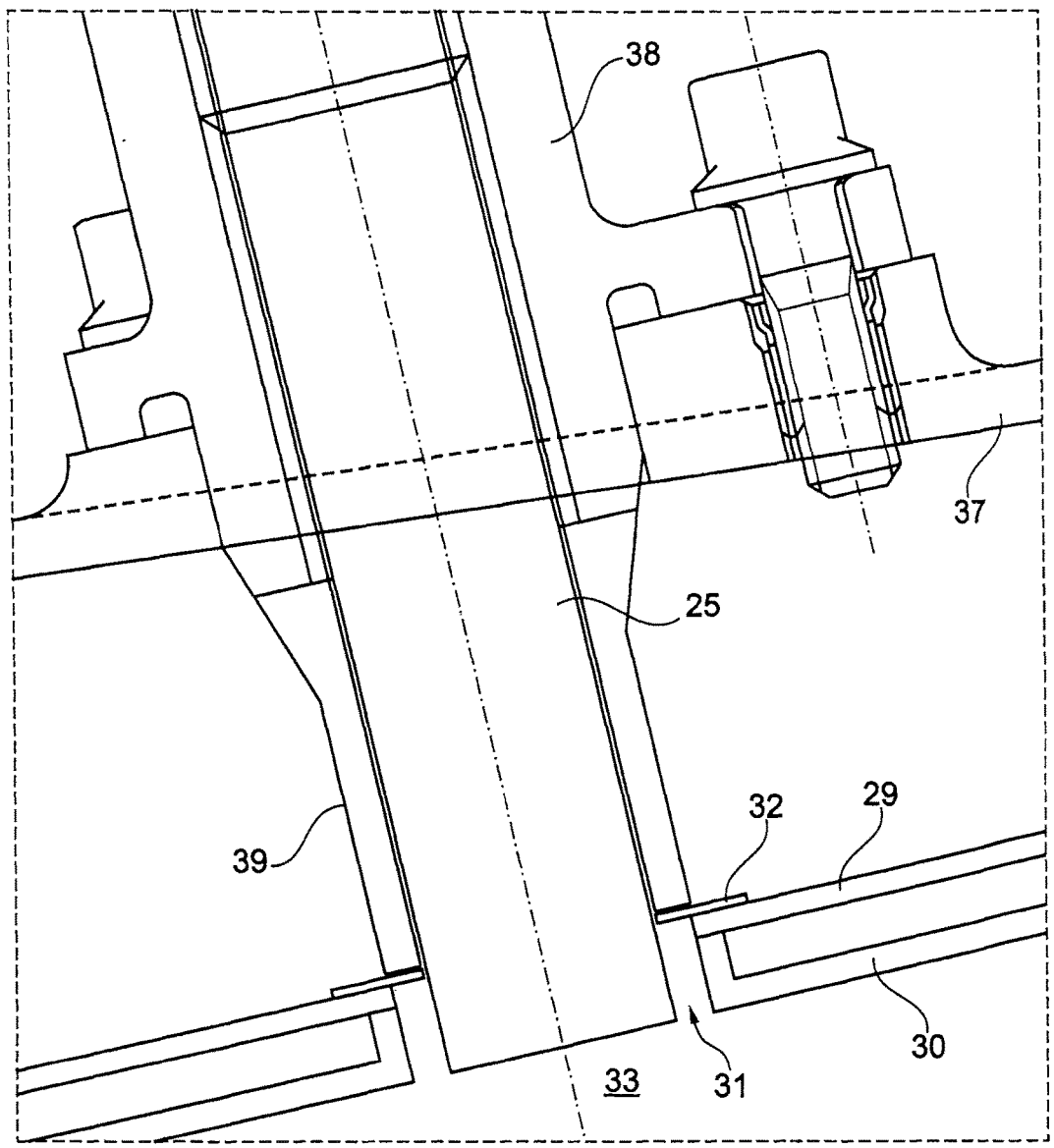

The present invention is described in the following in light of the accompanying drawing showing exemplary embodiments. In the drawing, FIG. 1 shows a schematic representation of a gas-turbine engine in accordance with the present invention, FIGS. 2-4 show simplified sectional side views of exemplary embodiments of the sealing arrangement in accordance with the present invention, FIG. 5 shows a top view onto an exemplary embodiment of the sealing ring in accordance with the present invention, FIG. 6 shows a perspective representation of two sealing rings placed one above the other, and FIG. 7 shows a variant of an exemplary embodiment, by analogy with FIG. 2.

The gas-turbine engine 10 in accordance with FIG. 1 is a generally represented example of a turbomachine where the invention can be used. The engine 10 is of conventional design and includes in the flow direction, one behind the other, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about an engine center axis 1.

The intermediate-pressure compressor 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17, 18 have similar stages, including an arrangement of fixed stator vanes 23 projecting radially inwards from the casing 21 into the annular flow duct through the turbines 16, 17, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine center axis 1 during operation.

FIGS. 2 to 4 each show in a schematic view a combustion chamber casing 37 to which an adapter 38 is fastened in order to mount an igniter plug 25. The latter passes via a recess 31 through an outer combustion chamber wall 29 and an inner combustion chamber wall 30. The combustion chamber interior is identified with the reference numeral 35.

On the outside, facing away from the combustion chamber interior 33, a flat, annular and flexible sealing ring 32 contacts the outer combustion chamber wall 29 and is brought into sealing contact by the pressure difference between the outside and the inside of the combustion chamber wall 29, 30. It is understood that combustion chambers are designed round as annular or individual combustion chambers, so that there is no flat surface on the outer combustion chamber wall 29. Due to the flexible design of the sealing ring 32, however, it can be in sealing contact around its full circumference.

To ensure that the sealing ring 32 is secured in the non-operating state of the gas turbine, the exemplary embodiment in FIG. 2 has a contact element 36 which is for example designed in the form of a snap ring fitted into a groove of the igniter plug 25. Alternatively, it is possible as shown in FIG. 3 to provide a projecting ring or the like on the igniter plug 25 to form the contact element 36. In the exemplary embodiment in FIG. 4, the contact element 36 is welded on, for example in the form of sections or segments extending around the circumference of the igniter plug 25.

FIG. 5 shows a top view onto the sealing ring in accordance with the invention. It can be seen here that the ring is provided with a plurality of slots 34 spread over its circumference and extending in particular from the edge area of the sealing ring 32. The reference numeral 35 shows the central recess of the sealing ring 32.

FIG. 6 shows an arrangement of two sealing rings placed one above the other, where it can be seen that the individual slots 34 are arranged offset to one another in the circumferential direction in order to optimize sealing.

FIG. 7 shows a design variant to FIG. 2 where a contact element 36 in the form of a separate snap ring is not required. The contact element is formed by an extended adapter 39 securing the sealing ring 32 against falling down. The adapter 39 in the exemplary embodiment shown is positioned between the igniter plug adapter 38 and the combustion chamber wall 29. Within the framework of the invention it is also possible for the adapter 38 of the igniter plug and the adapter 39 to be integrated to form one component, in particular when the distance between the combustion chamber casing 37 and the outer combustion chamber wall 29 is optimized and/or reduced.

LIST OF REFERENCE NUMERALS

1 Engine center axis
10 Gas-turbine engine/core engine
11 Air inlet
12 Fan
13 Intermediate-pressure compressor (compressor)
14 High-pressure compressor
15 Combustion chamber
16 High-pressure turbine
17 Intermediate-pressure turbine
18 Low-pressure turbine
19 Exhaust nozzle
20 Guide vanes
21 Core engine casing 22 Compressor rotor blades
23 Stator vanes
24 Turbine blades
25 Igniter plug
26 Compressor drum or disk
27 Turbine rotor hub
28 Exhaust cone
29 Outer combustion chamber wall
30 Inner combustion chamber wall
31 Recess
32 Sealing ring
33 Combustion chamber interior
34 Slot
35 Central recess
36 Contact element
37 Combustion chamber casing
38 Adapter
39 Adapter

What is claimed is:

1. A sealing arrangement of an igniter plug of a combustion chamber of a gas turbine, comprising:
   a combustion chamber wall including a recess, the combustion chamber wall being annular and including a round annular outer combustion chamber wall adjacent the recess;
   an igniter plug passing through the recess,
   at least one sealing ring including a central bore through which the igniter plug projects, the at least one sealing ring being in sealing contact with an edge area of the recess facing away from an interior of the combustion chamber, wherein the at least one sealing ring is brought into the sealing contact by a pressure difference between an outside and an inside of the combustion chamber wall;
   the at least one sealing ring including a first sealing ring and a second sealing ring, each being a flat, annular and flexible disk with the central bore;
   wherein the first sealing ring includes a first plurality of slots radially arranged with respect to the central bore and spaced apart around a circumference of the first sealing ring, the first plurality of slots passing from a first flat side to an opposite second flat side of the first sealing ring;
   wherein the second sealing ring includes a second plurality of slots radially arranged with respect to the central bore and spaced apart around a circumference of the second sealing ring, the second plurality of slots passing from a first flat side to an opposite second flat side of the second sealing ring;
   wherein the first sealing ring and the second sealing ring are stacked one above another;
   wherein the first sealing ring is circumferentially oriented with respect to the second sealing ring such that the first plurality of slots are circumferentially offset in a circumferentially non-overlapping manner with respect to the second plurality of slots, thereby preventing a direct axial path through the stacked first and second sealing rings via the first or second plurality of slots.

2. The sealing arrangement in accordance with claim 1, wherein the at least one sealing ring is a sheet-metal component.

3. The sealing arrangement in accordance with claim 1, wherein the plurality of sealing rings are connected to one another.

4. The sealing arrangement in accordance with claim 3, wherein the igniter plug includes at least one contact element supporting the at least one sealing ring.

5. The sealing arrangement in accordance with claim 4, wherein the at least one contact element is a locking ring.

6. The sealing arrangement in accordance with claim 4, wherein the at least one contact element is an annular projection on the igniter plug.

7. The sealing arrangement in accordance with claim 4, wherein the at least one contact element is an adapter enclosing the igniter plug and positioned between an igniter plug adapter and the combustion chamber wall.

8. The sealing arrangement in accordance with claim 1, wherein the igniter plug includes at least one contact element supporting the at least one sealing ring.

9. The sealing arrangement in accordance with claim 8, wherein the at least one contact element is a locking ring.

10. The sealing arrangement in accordance with claim 8, wherein the at least one contact element is an annular projection on the igniter plug.

11. The sealing arrangement in accordance with claim 8, wherein the at least one contact element is an adapter enclosing the igniter plug and positioned between an igniter plug adapter and the combustion chamber wall.

* * * * *